(12) United States Patent
Oikawa et al.

(10) Patent No.: US 11,048,236 B2
(45) Date of Patent: Jun. 29, 2021

(54) PARAMETER DETERMINATION SUPPORT DEVICE, PARAMETER DETERMINATION SUPPORTING METHOD, AND PROGRAM

(71) Applicant: FANUC CORPORATION, Yamanashi (JP)

(72) Inventors: Kouki Oikawa, Yamanashi (JP); Yuuki Morita, Yamanashi (JP); Tadashi Okita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 105 days.

(21) Appl. No.: 16/668,628

(22) Filed: Oct. 30, 2019

(65) Prior Publication Data

US 2020/0201288 A1 Jun. 25, 2020

(30) Foreign Application Priority Data

Dec. 20, 2018 (JP) .............................. JP2018-238116

(51) Int. Cl.
*G05B 19/416* (2006.01)
*G05D 3/20* (2006.01)
(Continued)

(52) U.S. Cl.
CPC ........... *G05B 19/416* (2013.01); *G05D 3/20* (2013.01); *G05D 13/62* (2013.01); *H02P 23/14* (2013.01); *G05B 2219/41319* (2013.01)

(58) Field of Classification Search
CPC ........ G05B 19/416; G05B 2219/41319; G05D 3/20; G05D 13/62; H02P 23/14
(Continued)

(56) References Cited

U.S. PATENT DOCUMENTS

| 4,051,419 A * | 9/1977 | Takahashi | G05B 19/293 318/721 |
| 5,402,341 A * | 3/1995 | Liubakka | B62D 7/159 180/412 |

(Continued)

FOREIGN PATENT DOCUMENTS

| JP | 2-39193 | 9/1990 |
| JP | 6-105582 | 4/1994 |

(Continued)

OTHER PUBLICATIONS

Notification of Reasons for Refusal dated Mar. 2, 2021 in JP Patent Application No. 2018-238116.

*Primary Examiner* — Jorge L Carrasquillo
(74) *Attorney, Agent, or Firm* — Wenderoth, Lind & Ponack, L.L.P.

(57) ABSTRACT

The determination of a slip constant is simplified upon driving a motor for which the slip constant is unknown, based on variation of acceleration when accelerating an induction motor from start up to a predetermined speed. A parameter determination support device for motor driving includes: an automatic measurement part which automatically measures characteristic information including a speed during acceleration and acceleration upon driving an induction motor to accelerate from start up to a predetermined speed set in advance which is no more than a base speed of the induction motor, relative to each slip constant, based on a plurality of slip constants set in advance; and an estimation part which estimates, as a slip constant of the induction motor, a slip constant having the smallest variation in acceleration, among a plurality of slip constants, based on the characteristic information.

3 Claims, 10 Drawing Sheets

(51) Int. Cl.
*G05D 13/62* (2006.01)
*H02P 23/14* (2006.01)

(58) Field of Classification Search
USPC .......................................................... 318/727
See application file for complete search history.

(56) References Cited

U.S. PATENT DOCUMENTS

| | | | | |
|---|---|---|---|---|
| 5,641,212 A * | 6/1997 | Sakai | ...................... | B60T 8/172 |
| | | | | 303/147 |
| 7,454,279 B2 * | 11/2008 | Fujioka | .................. | B62D 6/005 |
| | | | | 303/149 |
| 8,035,322 B2 * | 10/2011 | Turner | .................... | H02P 23/14 |
| | | | | 318/51 |
| 2019/0317479 A1 * | 10/2019 | Oikawa | .................. | H02P 21/14 |

FOREIGN PATENT DOCUMENTS

| | | |
|---|---|---|
| JP | 2778753 B2 | 7/1998 |
| JP | 2000-032614 A | 1/2000 |

\* cited by examiner

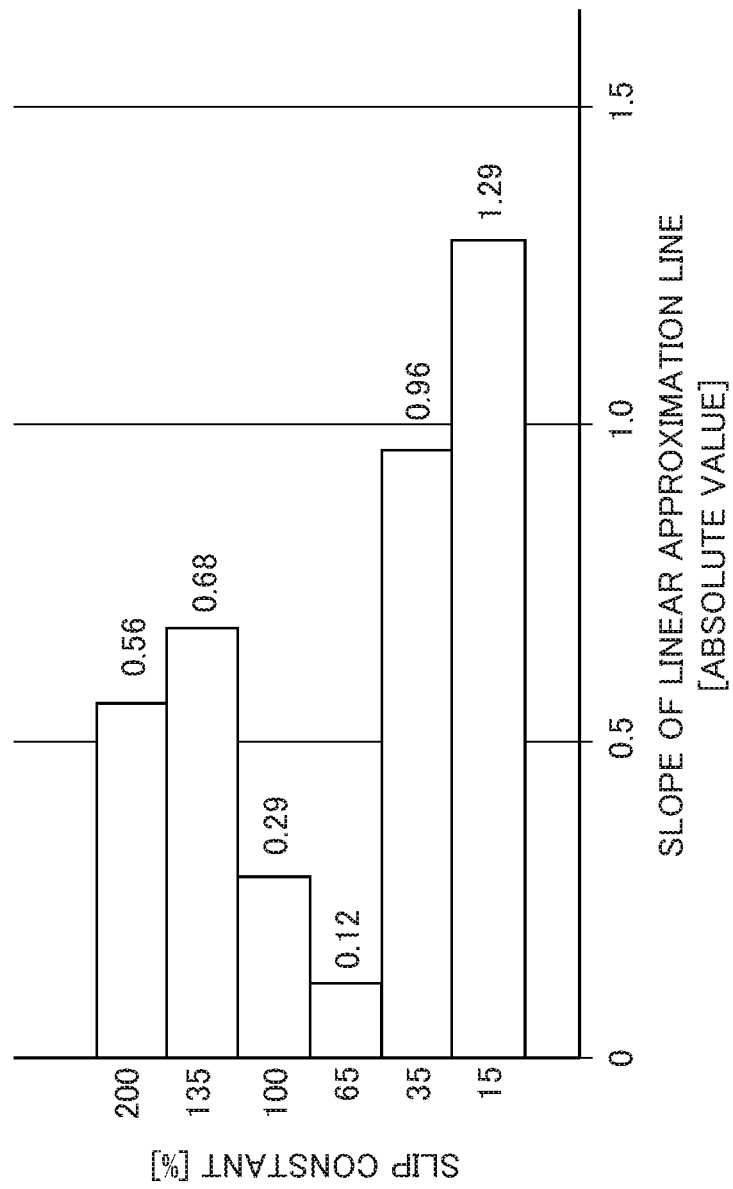

PARAMETER DETERMINATION SUPPORT DEVICE, PARAMETER DETERMINATION SUPPORTING METHOD, AND PROGRAM

This application is based on and claims the benefit of priority from Japanese Patent Application. No. 2018-238116, filed on 20 Dec. 2018, the content of which is incorporated herein by reference.

BACKGROUND OF THE INVENTION

Field of the Invention

The present invention relates to a parameter determination support device, parameter determination supporting method, and a program.

Related Art

In order to control an induction motor used in a machine tool, a packaging machine, an industrial robot, etc., it is necessary to set drive parameters for driving the induction motor to the appropriate value. As one method thereof, a means which adjusts the slip constant of the induction motor, and sets the drive parameter to the appropriate value based on the adjusted slip constant has been known.

Patent Document 1 discloses a means which compensates a sliding frequency so that the error between the command value and actual value for the counter-electromotive force of an electric motor becomes zero. Patent Document 2 discloses a means which performs regulated acceleration and automatically adjusts the optimum rated sliding of an induction motor, from the correlation between the torque command acquired at each rotation number and the actual torque.

Patent Document 1: Japanese Examined Patent Application Publication No. H02-039193
Patent Document 2: Japanese Unexamined Patent Application, Publication. No. H06-105582

SUMMARY OF THE INVENTION

However, the configuration of Patent Document 1 is a control device of a motor, rather than an independent adjustment device for adjusting parameters. In addition, the configuration of Patent Document 2 requires acquiring the correlation between torque command and actual torque; therefore, the processing until determining parameters is complex. Furthermore, with these configurations, it has been difficult to determine a slip constant in a motor for which the slip constant is unknown.

FIG. 1 is a view showing an example of an equivalent circuit of an induction motor. FIG. 1A shows an equivalent circuit of a common induction motor, and FIG. 1B shows an equivalent circuit in a case of establishing secondary leakage inductance as zero.

It should be noted that R1 indicates primary resistance. R2 indicates secondary resistance. s indicates slip. l1 indicates primary leakage inductance. l2 indicates secondary leakage inductance. M indicates mutual inductance. I1 indicates primary electrical current. I2 indicates secondary electrical current. Im indicates excitation current.

In addition, $l=l1+l2$, $M'=M^2/(M+l2)$, and $R2'=\{M/(M+l2)\}^2 \times R2$.

Then, so long as the slip constant is set appropriately (slip is appropriate relative to actual secondary resistance), the primary electrical current input to the inductance motor from the motor drive device (amplifier) by the current control will be in accordance with the components of the calculated excitation current command and the secondary current command. In other words, the inductance motor is able to generate actual torque according to the command (stable current command according to the torque command is possible).

For this reason, if the slip constant can be set appropriately, the linearity of the actual torque and torque command will improve. It should be noted that, generally, the actual torque is insufficient in the vicinity of base speed when the set value of the slip constant is large, the actual torque becomes excessive when the setting value of the slip constant is small, and thus the linearity of the actual torque and torque command becomes poor.

In view of these matters, it is possible to generate the desired torque if the setting of the slip constant is appropriate, and the motor acceleration up to the base speed during no-load can be estimated as being stable at the maximum torque constant (i.e. constant motor acceleration with little undulation can be obtained, irrespective of motor speed). Given this, even without conducting actual torque measurement, estimation of the slip constant becomes possible with only the measurement/evaluation of the waveform of acceleration according to the slip setting value. It should be noted that this estimation can be confirmed by way of experimental results as described later.

Therefore, the present invention has an object of providing a parameter determination support device, parameter determination supporting method, and a program, capable of simplifying determination of a slip constant upon driving a motor for which the slip constant is unknown, based on the variation in acceleration when accelerating the induction motor from start up to a predetermined speed.

A parameter determination support device (for example, the parameter determination suppose device 11 described later) for motor driving according to a first aspect of the present invention includes: an automatic measurement means (for example, the automatic measurement part 117 described later) for automatically measuring characteristic information including speed during acceleration and acceleration upon driving the induction motor (for example, the motor 41 described later) to accelerate from start up to a predetermined speed set in advance which is no more than a base speed of the induction motor, relative each slip constant, based on a plurality of slip constants set in advance; and an estimation means (for example, the estimation part 118 described later) for estimating, as a slip constant of the induction motor, a slip constant having the smallest variation in the acceleration, among the plurality of slip constants, based on the characteristic information.

According to a second aspect of the present invention, the parameter determination support device as described in the first aspect, the estimation means may further make a linear approximation of a variable relative to the speed of the acceleration in a predetermined speed range which is no more than the base speed for each slip constant, and may estimate, as a slip constant of the induction motor, a slip constant having the smallest slope of a variable relative to the speed of the acceleration which was linear approximated, among the plurality of slip constants.

A parameter determination supporting method according to a third aspect of the present invention supports the determination of a control parameter of an induction motor which is realized by a computer, the method including: an automatic measurement step of automatically measuring, based on a plurality of slip constants set in advance, characteristic information including a speed during acceleration and acceleration upon driving the induction motor to accelerate from start up to a predetermined speed set in advance which is no more than a base speed of the induction motor, relative to each slip constant; and an estimation step of estimating, based on the characteristic information which was automatically measured in the automatic measurement step, a slip constant having the smallest variation in the acceleration among the plurality of slip constants, as the slip constant of the induction motor.

According to a fourth aspect of the present invention, in the parameter determination support method as described in the third aspect, the estimation step further makes a linear approximation of a variable relative to the speed of the acceleration in a predetermined speed range which is no more than the base speed for each slip constant, and estimates, as a slip constant of the induction motor, a slip constant having the smallest slope of the variable relative to the speed of the acceleration which was linearly approximated, among the plurality of slip constants.

A program according to a fifth aspect or the present invention causes a computer to operate as the parameter determination support device as described in the first or second aspect.

According to the present invention, it becomes possible to simplify determination of a slip constant upon driving a motor for which the slip constant is unknown, based on the variation in acceleration when accelerating the induction motor from start up to a predetermined speed.

BRIEF DESCRIPTION OF THE DRAWINGS

FIG. 10 is a view showing an example of the absolute value of the slope of the linear approximation line for every slip constant.

DETAILED DESCRIPTION OF THE INVENTION

Hereinafter, an embodiment of the present invention will be described in detail while referencing FIGS. 2 to 10.

Figure 1A:
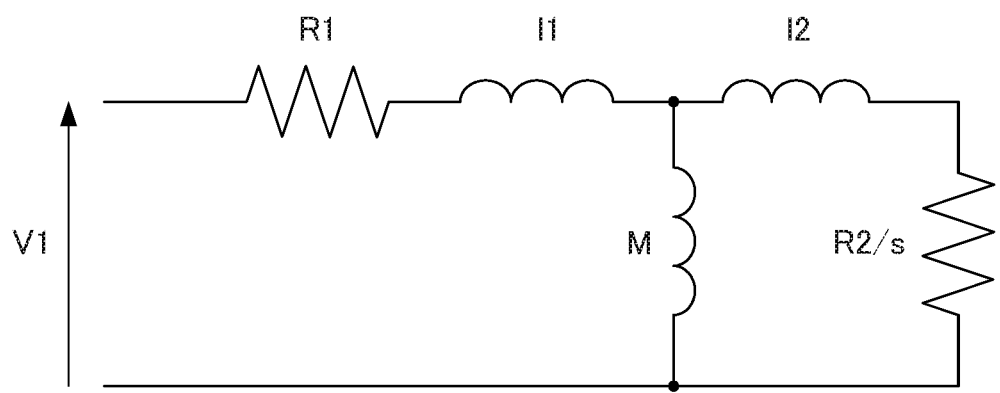
FIG. 1A is a view showing an example of an equivalent circuit of an induction motor.
Figure 1B:
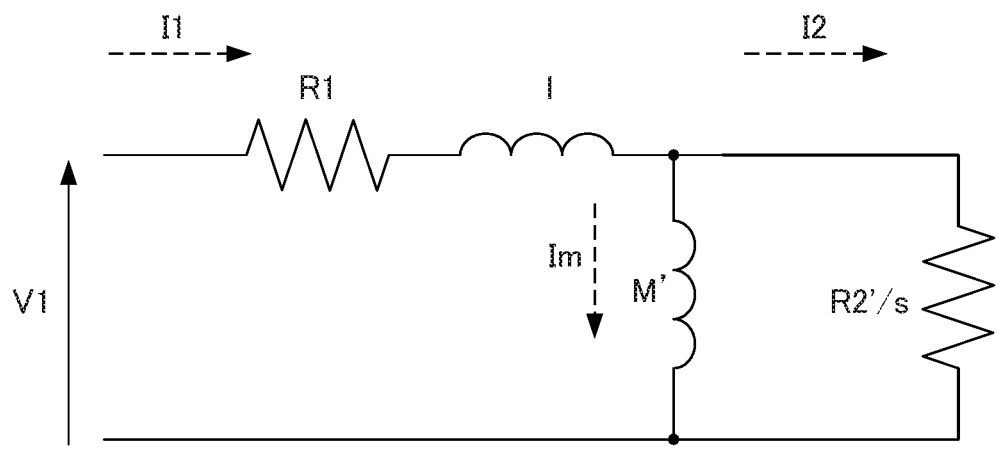
FIG. 1B is a views showing an example of an equivalent circuit of an induction motor.
Figure 2:
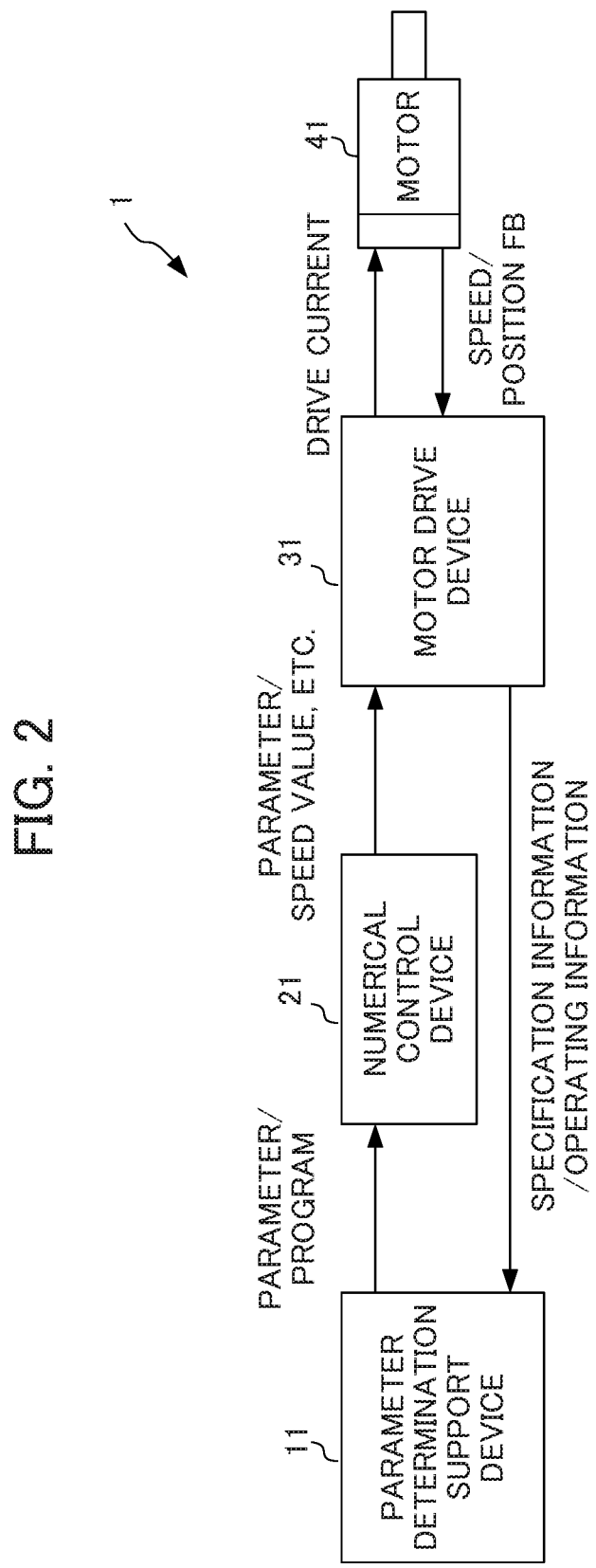
FIG. 2 is a block diagram showing the overall configuration of a motor drive system including a parameter determination support device according to an embodiment of the present invention.

FIG. 2 shows the overall configuration of a motor drive system 1 which includes a parameter determination support device according to an embodiment of the present invention.

In addition to the parameter determination support device 11, the motor drive system 1 is equipped with a numerical control device 21, a motor drive device 31, and an induction motor 41.

The parameter determination support device 11 determines initial parameters for test running of the induction motor 41, based on the specifications of the motor drive device 31 received from the motor drive device 31, and output specification information of the induction motor 41 inputted by the operator to the parameter determination support device 11; and creates a test running program for performing test runs based on the specification information, output specification information and initial parameters.

In order to estimate the slip constants of the induction motor 41, when rotating the induction motor 41 at a substantially constant rotation number (substantially constant speed), and accelerating and decelerating, it is necessary to confirm the data such as drive current value, drive voltage value and rotation number (operating information); however, "test run" herein is the matter of a test run causing the induction motor 41 to drive in order for confirmation of these data.

In addition, "drive voltage value" is the voltage required to actually drive the induction motor 41 at a certain rotation number, and is calculated based on the original voltage of the power source, and/or command value for voltage.

In addition, "initial parameters" herein, for example, include at least one among the maximum current value for driving the induction motor 41, D-phase current value, Q-phase voltage value, highest rotation number of the induction motor 41, plurality of slip constants, and coefficient converting the feedback of current value introduced from the motor drive device 31 into an actual physical quantity.

In addition, "specification information" herein includes at least one among the allowable current value and drivable frequency of the motor drive device 31, for example.

In addition, "output specification information" herein includes at least one among the rated output and base rotation number of the induction motor 41.

Furthermore, the parameter determination support device 11 sends this initial parameter and test-run program to the numerical control device 21. The numerical control device 21 generates command values such as the position command value and speed command value by executing the test-run program applying the initial parameter, and sends to the motor drive device 31 along with the initial parameter.

The motor drive device 31 supplies the drive current based on the initial parameter and command values received from the numerical control device 21 to the induction motor 41.

The induction motor 41 sends feedback values of the speed information, position information, rotation number, etc. to the motor drive device 31.

The motor drive device 31 sends to the parameter determination support device 11 the operating information including the feedback values received from the induction motor 41, drive current value, command value to the induction motor 41, etc. It should be noted that "operating information" herein includes the rotation number SPEED (rpm) of the induction motor 41, as well as the DC link voltage VDC (V) and Q-phase voltage command VQCMD (%) of the motor drive device 31.

The parameter determination support device 11 estimates the slip constant of the induction motor 41, based on the operating information received from the motor drive device 31. Furthermore, the parameter determination support device 11 performs calculation of a control parameter (hereinafter also referred to as "optimum parameter") tailored to the output specifications of the induction motor 41 based on this slip constant, and sends this optimum parameter to the numerical control device 21. It should be noted that slip constant S is generally represented by S=(Ns[rpm]−N [rpm])/Ns[rpm]. Herein, N is the actual rotation number of the induction motor, and Ns (rpm) is the synchronous rotation number in the case of synchronizing with the phase of excitation current.

Figure 3:
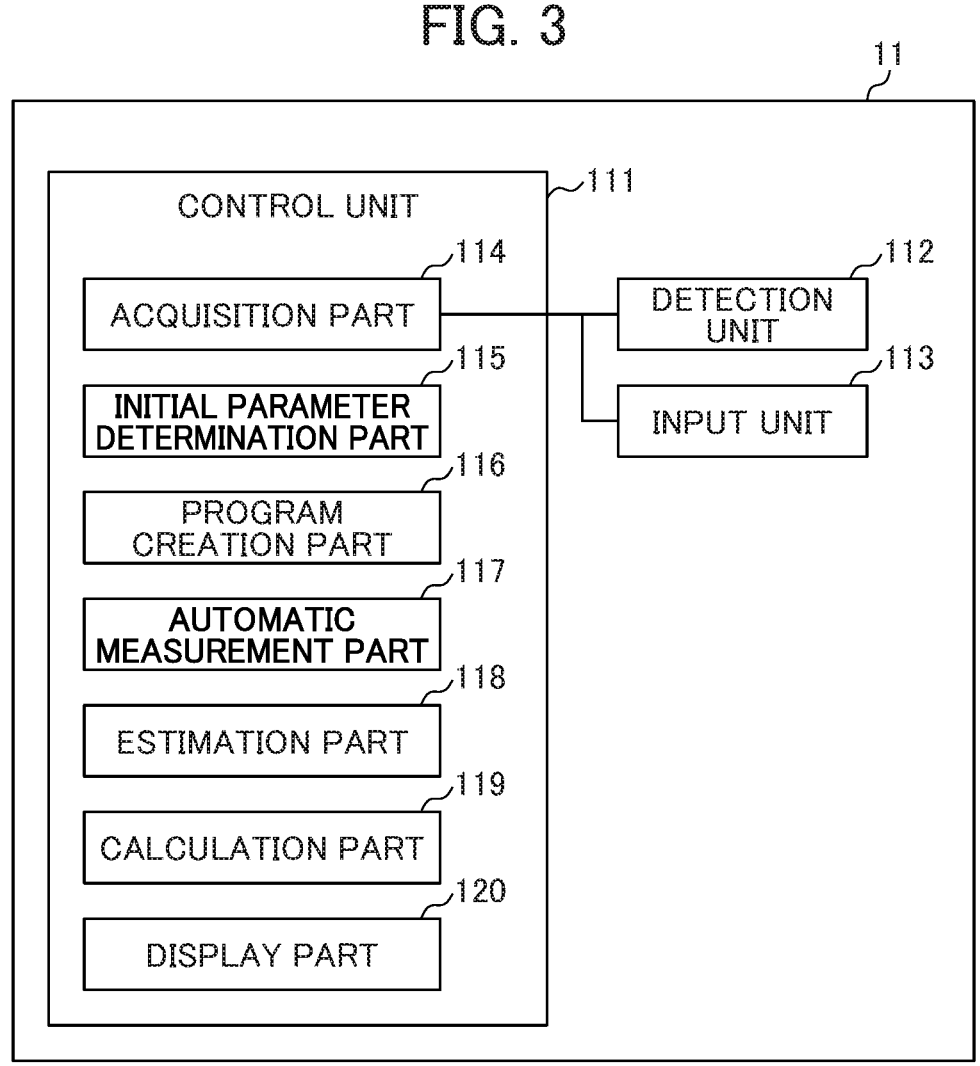
FIG. 3 is a block diagram showing functions of the parameter determination support device shown in FIG. 2.

FIG. 3 is a block diagram showing the functions of the parameter determination support device 11. The parameter determination support device 11 includes a control unit 111, detection unit 112 and input unit 113, and further, the control unit 111 includes an acquisition part 114, initial parameter determination part 115, program creation part 116, automatic measurement part 117, estimation part 118, calculation part 119 and display part 120.

The control unit 111 has a CPU, ROM, RAM, CMOS memory, etc., and these are known components to persons skilled in the art, configured to be communicable with each other via a bus.

The CPU is a processor which controls the parameter determination support device 11 overall. The CPU reads out a system program and application programs stored in the ROM via a bus, and controls the parameter determination support device 11 overall in accordance with this system program and application program. The control unit 111 is thereby configured so as to realize the functions of the acquisition part 114, initial parameter determination part 115, program creation part 116, automatic measurement part 117, estimation part 118, calculation part 119 and display part 120, as shown in FIG. 3. Various types of data such as temporary calculation data and display data are stored in the RAM. The CMOS memory is configured as non-volatile memory which is backed up by a battery (not shown), and in which the stored state is maintained even if the power source of the parameter determination support device 11 is turned OFF.

The acquisition part 114 acquires the specification information of the motor drive device 31 and the output specification information of the induction motor 41. Specifically, the acquisition part 114 acquires specification information of the motor drive device 31 from the detection part 112 described later, and acquires output specification information of the induction motor 41 from the input unit 113 described later.

The initial parameter determination part 115 determines the initial parameter for test running, based on the specification information and output specification information acquired by the acquisition part 114. It should be noted that a plurality of slip constants set in advance is included in the initial parameter for test running.

The program creation part 116 creates a test-run program based on the output specification information acquired by the acquisition part 114. This test-run program is used in test running for acquiring data required in the adjustment of parameters determining the output of the induction motor 41.

The automatic measurement part 117 automatically measures the operating information upon driving the induction motor 41 to accelerate from start up to a predetermined speed set in advance which is no more than the base speed of the induction motor 41 from startup (e.g., stopped state), according to the above-mentioned test-run program, by applying the above-mentioned initial parameter. More specifically, the automatic measurement part 117 automatically measures the characteristic information including the speed and acceleration during acceleration of the induction motor 41 as the operating information, relative to the respective slip constants, based on the plurality of slip constants included in the initial parameter.

The estimation part 118 estimates the slip constant of the induction motor 41 based on the operating information measured by the automatic measurement part 117. The slip constant S is estimated using the operating information. An explanation of the detailed processing contents of the estimation part 118 is provided later using the flowchart illustrated in FIG. 7.

The calculation part 119 performs calculation of an optimum parameter tailored to the output specification of the induction motor 41, based on the slip constants estimated by the estimation part 118. It should be noted that calculation of the optimum parameter can employ a well-known technique to a person skilled in the art, and thus explanation thereof will be omitted.

The display part 120 displays various information on a display (not shown) equipped to the parameter determination support device 11. "Various information" herein includes at least one among the operating information measured by the automatic measurement part 117, the slip constant estimated by the estimation part 118, and the optimum parameter calculated by the calculation part 119.

It should be noted that the display part 120 may display navigation information, which serves as a guide for the operator to input output specification information using the input unit 113 described later. It should be noted that this navigation information is not limited in the input method of output specification information and, for example, may include information such as the operating method of the parameter determination support device 11.

The detection unit 112 is a device which detects the specification information of the motor drive device 31 and, for example, is a sensor. In addition, the input unit 113 is a device used in order for the operator to input the output specification information of the induction motor 41 and, for example, is a keyboard and/or touch panel.

Figure 4:
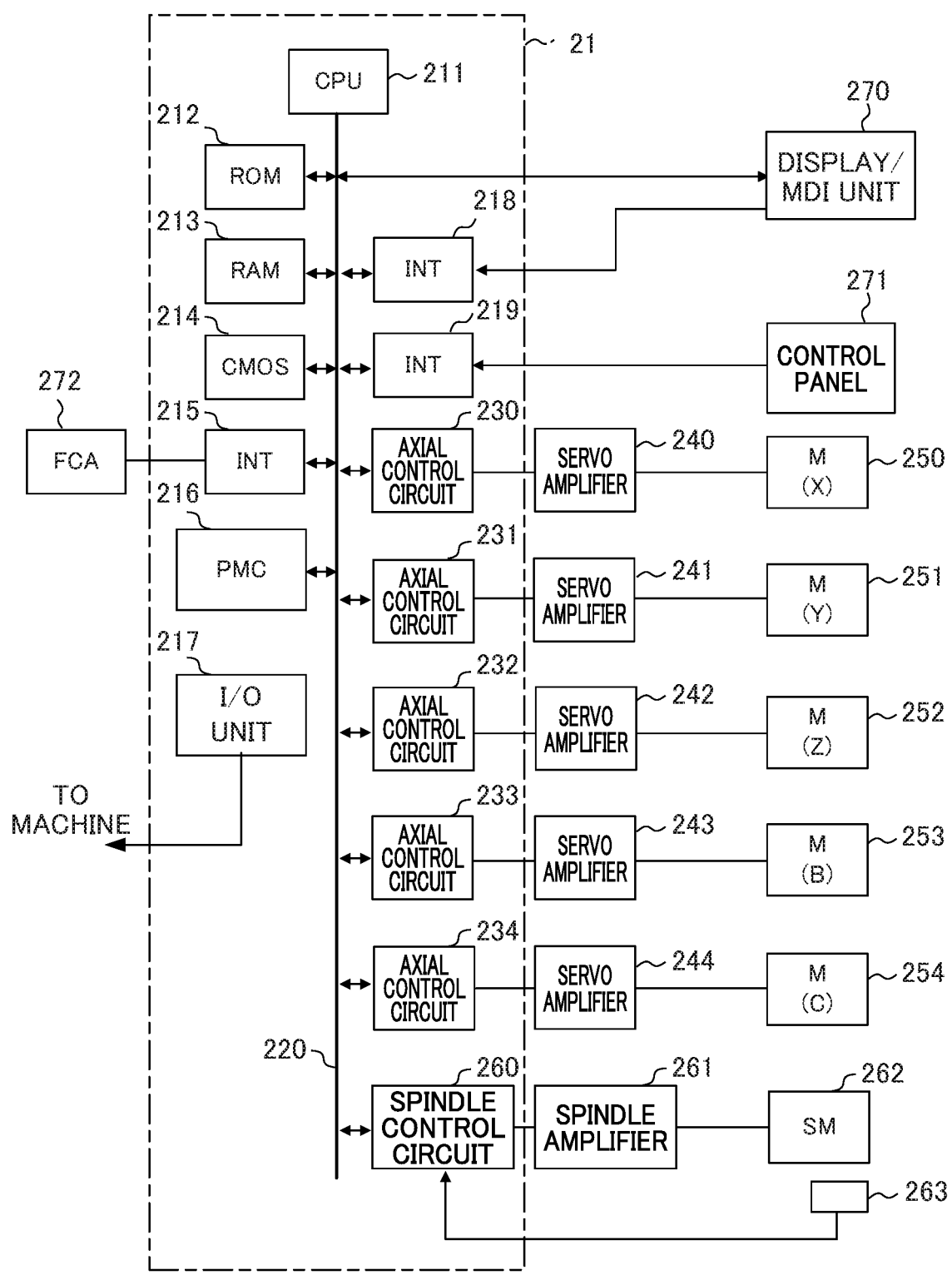
FIG. 4 is a block diagram showing the configuration of the numerical control device shown in FIG. 2.

FIG. 4 shows the configuration of the numerical control device 21. The numerical control device 21 mainly includes a CPU 211, ROM 212, RAM 213, CMOS 214, interfaces 215, 218, 219, PMC (Programmable Machine Controller) 216, I/O unit 217, axis control circuits 230 to 234, and spindle control circuit 260.

The CPU 211 is a processor which controls the numerical control device 21 overall. The CPU 211 reads out a system program stored in the ROM 212 via the bus 220, and controls the numerical control device 21 overall in accordance with this system program.

Temporary calculation data, display data and various data inputted by the operator via the display/MDI unit 270 are stored in the RAM 213.

The CMOS memory 214 is configured as non-volatile memory which is backed up a battery (not shown), and the stored state is maintained even when the power source of the numerical control device 21 is turned OFF. Machining programs read via the interface 215, machining programs inputted via the display/MDI unit 270, etc. are stored in the CMOS memory 214.

Various system programs for conducting processing of an editing mode necessitated for the creation and editing of machining programs, and processing for automatic operation are written in advance in the ROM 212.

The various machining programs can be inputted via the interface 215 or display/MDT unit 270, and stored in the CMOS memory 214.

The interface 215 enables connection of the numerical control device 21 and external equipment 272 such as adapters. From the external equipment 272 side, a machining program, various parameters, etc. are read. In addition, the machining program edited in the numerical control device 21 can be made to store an external storage means via the external equipment 272.

The PMC (Programmable Machine Controller) 216 controls by outputting signals via the I/O unit 217 to control auxiliary equipment such a machine tools (for example, actuators such as robot hands for tool exchange) by a sequence program built into the numerical control device 21. In addition, after receiving signals such as of various switches on a control panel disposed to the main body of the machine tool, and doing the required signal processing, transfers them to the CPU 211.

The display/MDI unit 270 is a manual data input device equipped with a display, keyboard, etc. The interface 218 receives commands and/or data from the keyboard of the display/MDI unit 270 and transfers to the CPU 211. The interface 219 is connected to the control panel 271 equipped with a manual pulse generator, etc.

The axis control circuits 230 to 234 of each axis receive movement command amounts of each axis from the CPU 211, and output the command of each axis to the servo amplifiers 240 to 244. The servo amplifiers 240 to 244 receive these commands, and drive the servomotors 250 to 254 of each axis. The servomotors 250 to 254 of each axis are equipped with a position/speed detector, and feedback a position/speed feedback signal from this position/speed detector to the axis control circuits 230 to 234 to perform feedback control of the position/speed. It should be noted that, in FIG. 4, the feedback of position/speed is omitted.

The spindle control circuit 260 receives a spindle rotation command to the machine tool, and outputs a spindle speed signal to a spindle amplifier 261. The spindle amplifier 261 receives this spindle speed signal, and causes the spindle motor 262 of the machine tool to rotate at the commanded rotation number, thereby driving the tool. To the spindle motor 262, a pulse encoder 263 is joined to the spindle motor 262 by gears, belt or the like, the pulse encoder 263 outputs a return pulse synchronous with the rotation of the spindle. The return pulse passes through the bus 220 and is read by the CPU 211.

It should be noted that the servo amplifier 240 to 244 and the spindle amplifier 261 correspond to the motor drive device 31 in FIG. 2. The servomotors 250 to 254 and spindle motor 262 correspond to the induction motor 41 in FIG. 2.

In addition, the configuration of the numerical control device 21 shown in FIG. 4 is ultimately just an example and is not limited thereto, and it is possible to employ a generic numerical control device as the numerical control device 21.

Figure 5:
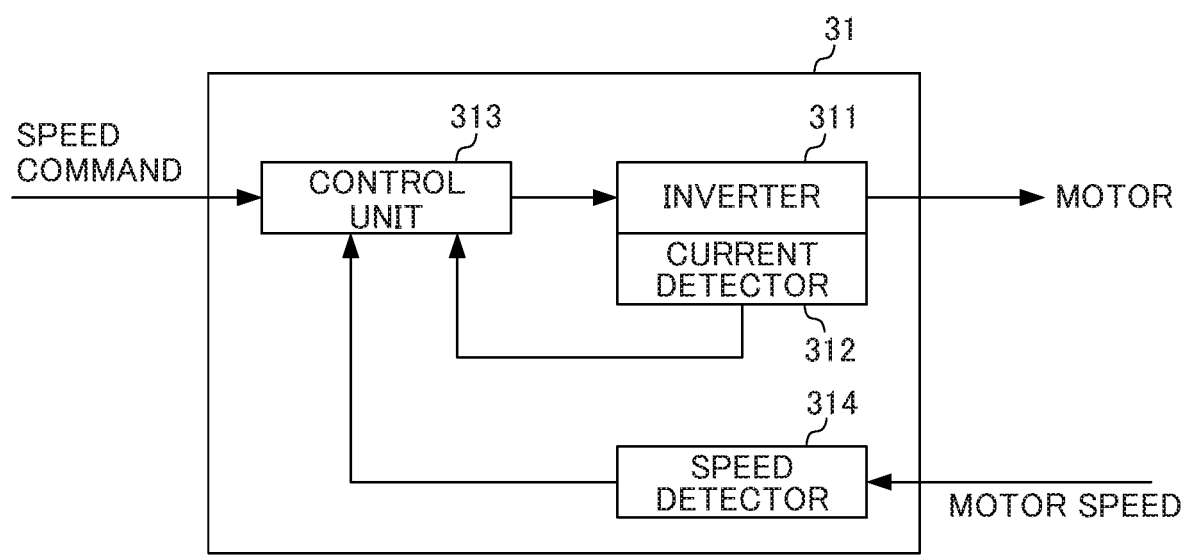
FIG. 5 is a block diagram showing the configuration of the motor drive device shown in FIG. 2.

FIG. 5 shows the configuration of the motor drive device 31. The motor drive device 31 includes an inverter 311, current detector 312, controller 313 and speed detector 314.

The inverter 311 supplies drive current to the induction motor 41. The current detector 312 detects the drive current being supplied to the induction motor 41. The controller 313 uses the speed command of the motor, the speed feedback of the induction motor 41 and the current value detected by the current detector 312 to conduct PWM control on the inverter 311. The speed detector 314 detects the speed for feedback control of the induction motor 41, and transmits the detected speed to the controller 313.

The configuration of the motor drive device 31 shown in FIG. 5 is ultimately just an example and is not limited thereto, and it is possible to employ a generic motor drive device as the motor drive device 31.

Figure 6:
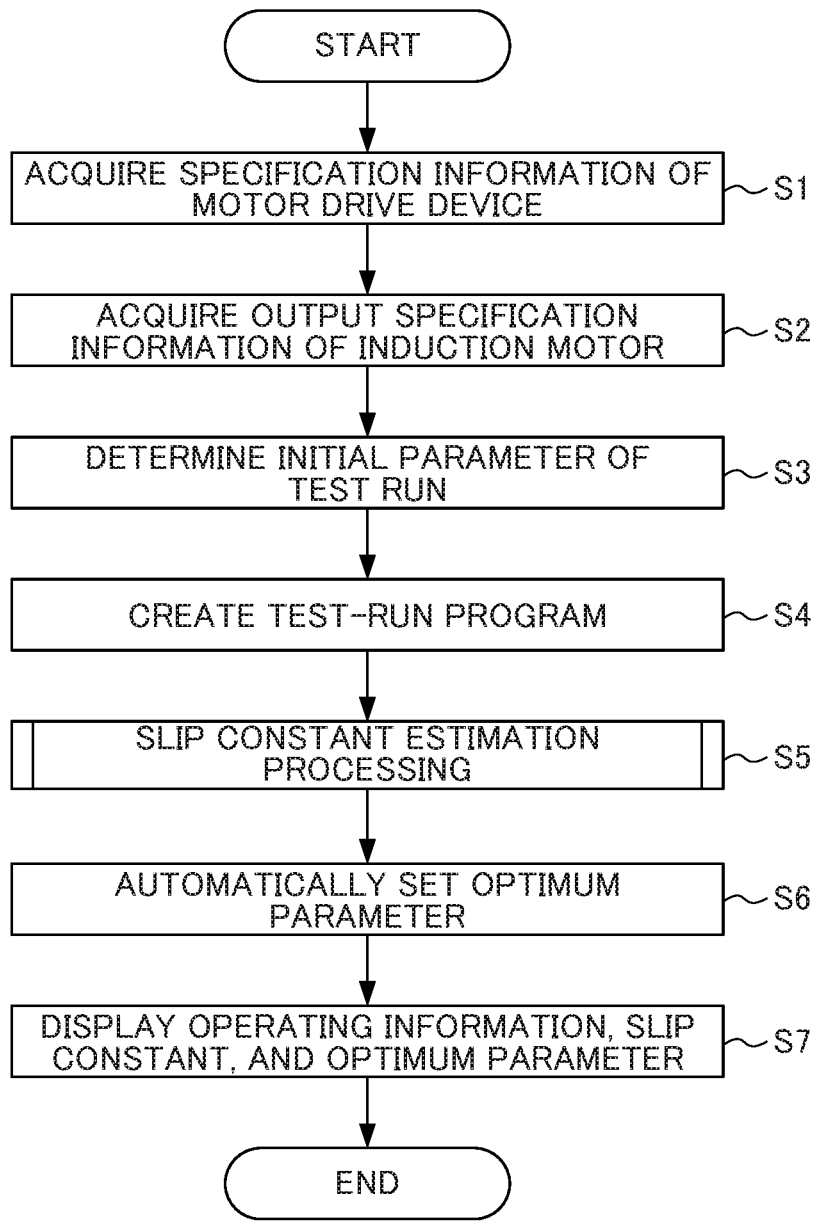
FIG. 6 is a flowchart illustrating operations of the parameter determination support device shown in FIG. 2.

FIG. 6 is a flowchart illustrating operation of the parameter determination support device 11.

In Step S1, the detection unit 112 detects the specification information of the motor drive device 31, and the acquisition part 114 acquires specification information from the detection unit 112.

In Step S2, the operator inputs the output specification information of the induction motor 41 from the input unit 113, and the acquisition part 114 acquires the output specification information from the input unit 113.

In Step S3, the initial parameter determination part 115 determines the initial parameter for test running based on the specification information and output specification information acquired by the acquisition part 114.

In Step S4, the program creation part 116 creates a test-run program for test running to acquire the data necessary in the estimation of the slip constants of the induction motor 41 and the adjustment of the parameters determining the output of the induction motor 41, based on the output specification information acquired by the acquisition part 114.

In Step S5, the estimation part 118 performs slip constant estimation processing based on the characteristic information including the speed during acceleration and acceleration, upon driving to accelerate the induction motor 41 from start, up to a predetermined speed set in advance which is no higher than the base speed of this induction motor 41, which was automatically measured for each of the plurality of slip constants by the automatic measurement part 117. The estimation part 118 estimates the slip constant of the induction motor 41. It should be noted that the detailed flow of the slip constant estimation processing is described later.

In Step S6, the calculation part 119 calculates to determine the optimum parameter tailored to the output specification of the induction motor 41, based on the slip constants estimated by the constant estimation processing in Step S5.

In Step S7, the display part 120 exchangeably displays on the display (not shown) the operating information which was automatically measured by the automatic measurement part 117, the slip constants estimated by the estimation part 118, and the optimum parameter calculated by the calculation part 119. It thereby becomes possible for the operator to judge whether the parameter determined in Step S9 is appropriate, while directly confirming the measurement data. According to the above, the operation flow of the parameter determination support device 11 ends.

Figure 7:
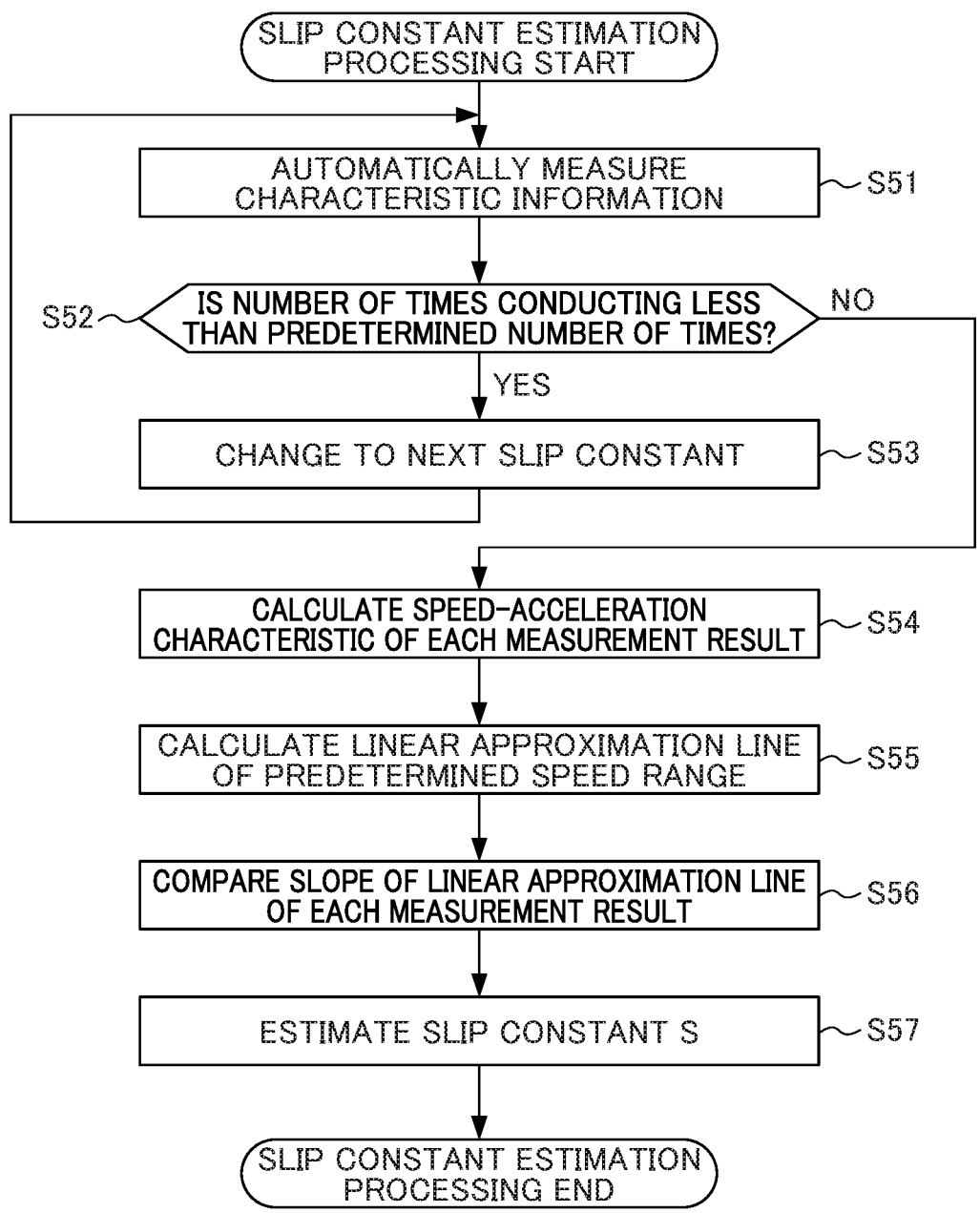
FIG. 7 is a flowchart illustrating the slip constant estimation processing shown in FIG. 6.

FIG. 7 is a flowchart illustrating the detailed processing contents of the slip constant estimation processing shown in Step S5 in FIG. 6. In the flowchart of FIG. 7, Steps S51 to S53 show the processing flow of the automatic measurement part 117. Steps S54 to S57 show the processing flow of the estimation part 118.

It should be noted that, in the following explanation, the predetermined speed is defined as the base speed of the induction motor 41; however, it is not limited thereto, and it is possible to set to any speed that is no more than the base speed.

First, in Step S51, the automatic measurement part 117 automatically measures the characteristic information including the speed (rpm) and acceleration (rpm/s) of the induction motor 41 upon driving to accelerate the induction motor 41 from start up to the base speed, according to the test-run program, based on one slip constant among the plurality of slip constants set in advance. It should be noted that the automatic measurement part 117, for example, calculates as the acceleration (rpm/s) a value arrived at by dividing the variation in speed of the induction motor 41 during a sampling cycle by the sampling cycle, using speed feedback of the induction motor 41.

In Step S52, the automatic measurement part 117 determines whether or not the number of times conducting automatic measurement is less than a predetermined number of times. Predetermined number of times is the number of the plurality of slip constants set in advance.

Then, the automatic measurement part 117 determines whether or not the characteristic information including the speed during acceleration and acceleration were acquired relative to all slip constants. In the case of not being acquired, the processing advances the Step S53. In the case of being acquired, the processing advances to Step S54.

In Step S53, the automatic measurement part 117 changes to the next slip constant. Then, the processing returns to Step S51, and the automatic measurement part 117 automatically measures the characteristic information at this slip constant, based on the changed slip constant. By configuring in this way, it is possible to acquire the characteristic information including the speed during acceleration and acceleration upon driving the induction motor 41 to accelerate from startup of the induction motor 41 up to a predetermined speed set in advance which is no more than the base speed, relative to each slip constant.

In Step S54, the estimation part 118 calculates the speed-acceleration characteristic, upon driving the induction motor 41 to accelerate from start up to a predetermined speed set in advance which is no more than the base speed of this induction motor 41, corresponding to each slip constant, from the measurement results (characteristic information) of each slip constant automatically measured by the automatic measurement part 117.

In Step S55, the estimation part 118 makes a linear approximation of a variable relative to the speed of acceleration in a predetermined speed range, based on the speed-acceleration characteristic of each slip constant, automatically measured by the automatic measurement part 117, and calculates the linear approximation line of the variable relative to the speed of acceleration. It should be noted that, due to being a rising or falling portion of acceleration of the induction motor 41, immediately after acceleration start and just before stopping in the vicinity of the base speed, the predetermined speed range is set to the range of 5 to 95% of the speed of the base speed, for example, so as to exclude, so as to exclude the data of this portion. The predetermined speed range is not limited thereto, and can be determined by any range of speed.

In Step S56, the estimation part 118 compares the slope of the linear approximation line of each slip constant calculated based on the operating information automatically measured by the automatic measurement part 117.

In Step S57, the estimation part 118 estimates the slip constant when the absolute value of the slope of the linear approximation line of the variable relative to the speed of acceleration is a minimum (undulation of motor acceleration becomes constantly small), as the slip constant of the induction motor 41. According to the above, the flow of the slip constant estimation processing ends, and the processing advances to Step S6.

<Specific Example of Slip Constant Estimation Processing>

Figure 8:
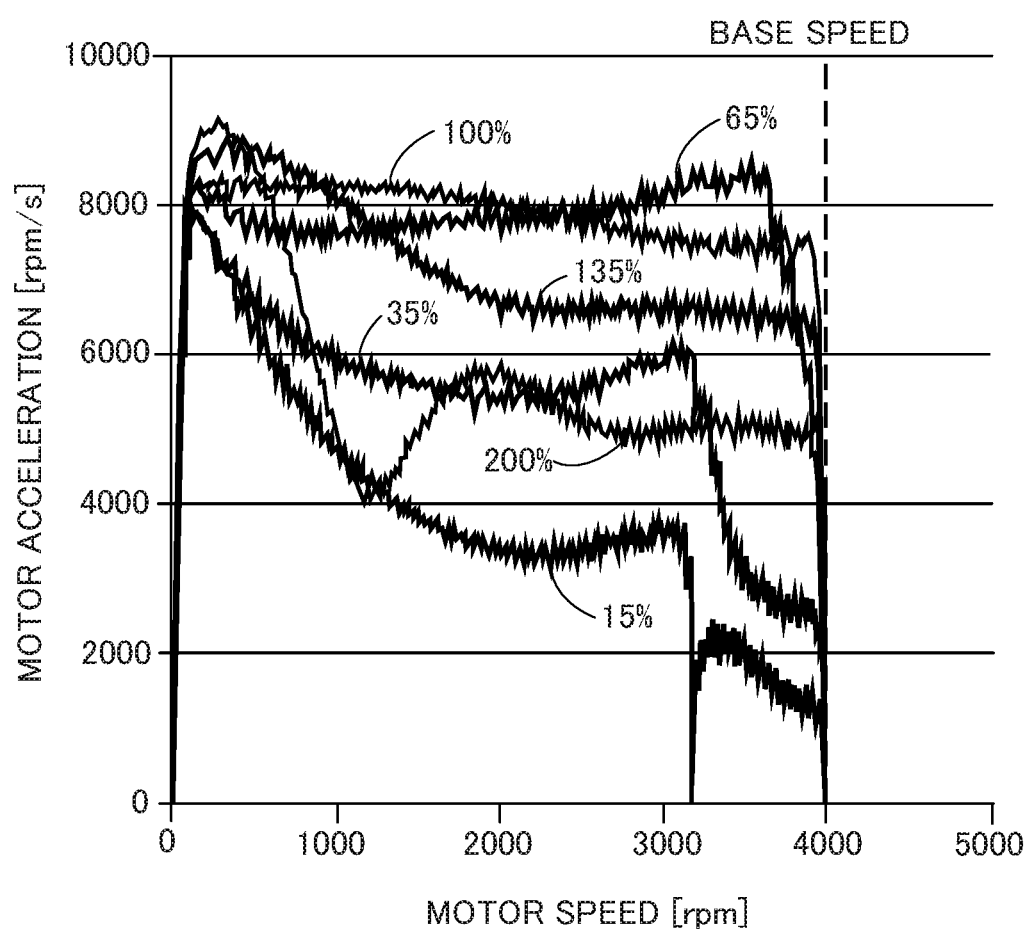
FIG. 8 is a view showing an example of a speed-acceleration characteristic for every slip constant.
Figure 9:
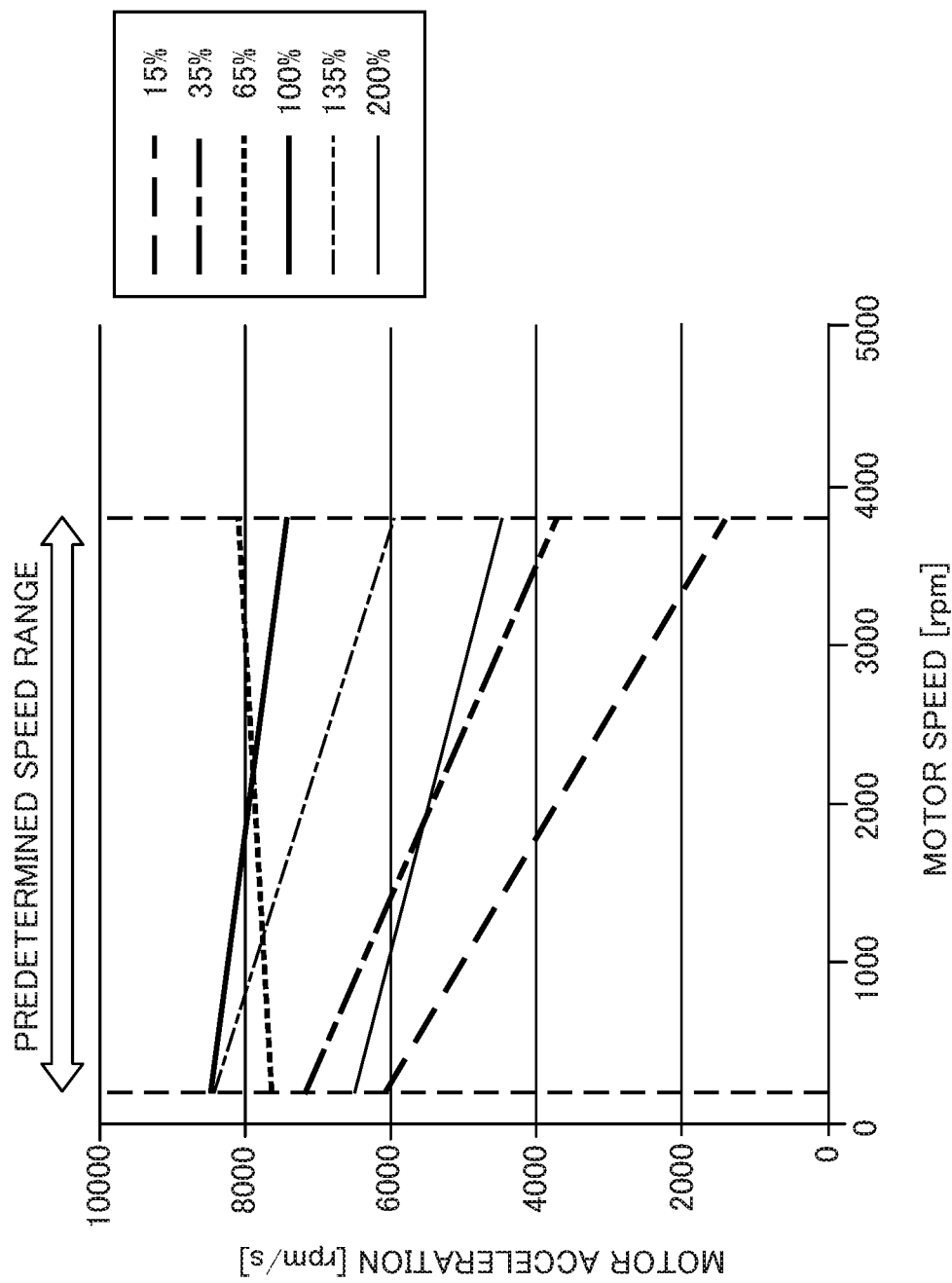
FIG. 9 is a view showing an example of a linear approximation line of the speed-acceleration characteristic for every slip constant.

Next, a specific example of slip constant estimation processing in FIG. 7 will be illustrated while referencing FIGS. 8 to 10.

FIG. 8 is an example of a graph of the speed-acceleration characteristic showing the relationship between the speed and acceleration of the induction motor 41 for each slip constant. Herein, for example, six slip constants shall be set based on a proportion (15%, 35%, 65%, 100%, 135%, 200%) relative to the slip constant serving as a reference. By configuring as such, the slip constant becomes smaller than the slip constant serving as reference as the proportion (%) becomes smaller, and the slip constant becomes larger than the slip constant serving as the reference, as the proportion (%) becomes larger.

In FIG. 8, for example, when a slip constant of 15%, 35%, 135% or 200%, it is found that the acceleration changes in a wave-like manner so that the acceleration undulates at a large amplitude relative to speed, as the speed of the induction motor 41 rises.

It should be noted that the setting method of the plurality of slip constants is not limited to a method of setting the proportion relative to the slip constant serving as reference. In addition, the proportion is not limited to six types. It may be set by any proportion. In addition, rather than a proportion, the slip constant itself may be set as any plurality.

FIG. 9, for example, is an example of a graph showing the linear approximation line of the variable relative to the speed of acceleration in a predetermined speed range (range of arrows). The legend in the margin shows the proportions of slip constants. In this case, when a slip constant of 15%, 35%, 100%, 135% or 200% as shown in FIG. 9, it is found that the linear approximation line declines as the speed of the induction motor 41 rises, and when a slip constant of 65%, the linear approximate line rises as the speed of the induction motor 41 rises.

FIG. 10 is one example of a graph showing the absolute value of the slope of the linear approximation line shown in FIG. 9 for every slip constant. As shown in FIG. 10, when comparing with a case of the proportion corresponding to the slip constant serving as the reference of 100%, it is found that the absolute value or the linear approximation line of the variable relative to the speed of acceleration is a minimum when the proportion corresponding to the slip constant is 65%. This shows that, when the proportion corresponding to the slip constant is 65%, the undulation of motor acceleration becomes constantly the smallest compared to other slip constants. In other words, when the proportion corresponding to the slip constant, is 65%, primary electric current inputted to the induction motor 41 becomes according to components of the calculated magnetic excitation command and secondary electric current command, and by the linearity of the actual torque and torque command improving, it can be considered the undulation of motor acceleration becomes a smaller constant irrespective of the motor speed.

On the other hand, when the proportion corresponding to the slip constant is 15%, 35%, 100%, 135% or 200%, the primary electric current inputted to the induction motor 41 is not in accordance with the components of the calculated magnetic excitation command and secondary electric current command, and by the linearity of the actual torque and torque command becoming worse, it can be considered that the motor acceleration changed so as to undulate in response to the motor speed.

It should be noted that, in the specific examples of FIGS. 8 to 10, the parameter determination support device 11 estimates, as the slip constant of the induction motor 41, the slip constant of a proportion (65%) at which the absolute value of the slope of the linear approximation line of the variable relative to the speed of acceleration becomes a minimum, from six slip constants relative to the proportions of 15%, 35%, 65%, 100%, 135% and 200%; however, it is not limited thereto. For example, the parameter determination support device 11 may estimate a slip constant having a smaller estimation error from the true value (motor setting value) of the slip constant of the induction motor 41, by increasing the search range of slip.

More specifically, for example, after estimating the slip constant of a proportion at which the absolute value of the slope of the linear approximation line becomes the smallest, the parameter determination support device 11 may perform a more detailed slip constant estimation processing with the slip constant vicinity of this proportion as the search range. By configuring in this way, the parameter determination support device 11 can estimate a slip constant closer to the true value (motor setting value) of the slip constant of the induction motor 41.

<Actual Experimental Results>

Next, an example is shown of actual experimental results prepared by performing slip constant estimation processing with the induction motor 41 having the true value of the slip constant (motor setting value) of 5.0 rad/s (angular velocity conversion) and base speed of 4,000 rpm as the induction motor of unknown slip constant. It should be noted that, in the experiments, the slip constant serving as the reference was set as 6.3 rad/s (angular velocity conversion), and six slip constants relative to the proportions of 15%, 35%, 65%, 100%, 135% and 200% were set at 1.05, 2.1, 4.2, 6.3, 8.4 and 12.5 rad/s (angular velocity conversion).

The absolute value of the slope of the linear approximation line of the variable relative to the speed of acceleration becomes smaller as approaching the true value (motor setting value) of the slip constant of the induction motor 41 of 5.0 rad/s (angular velocity conversion), and became a minimum when the 65% slip constant (4.2 rad/s (angular velocity conversion)) closest to the true value of the slip constant (motor setting value).

Based on these matters, it was confirmed as mentioned above that from these experimental results it is possible to generate the desired torque so long as the setting of slip constant is appropriate, and possible to estimate the motor acceleration up to the base speed while unloaded as stable at the maximum torque constant. (i.e. constant motor acceleration of small undulation irrespective of the motor speed is obtained).

In this way, the parameter determination support device 11, even without carrying out troublesome actual torque measurement, estimates an appropriate slip constant of the induction motor 41, by comparing the absolute values of the slopes of linear approximation lines of variables relative to the speed of acceleration by comprehensively varying the slip constant. The parameter determination support device 11 can automatically determine a control parameter, in a case of driving the induction motor 41 at the slip constant. It thereby becomes possible to simplify the determination of the slip constant, upon driving an induction motor for which the slip constant is unknown. In addition, the parameter determination support device 11 becomes able to shorten the time required in determination, and thus able to reduce the cost, due to not directly measuring the actual torque.

In addition, the above-mentioned parameter determination support device 11 further includes the display part 120 which displays at least one among the measured operating information, the estimated slip constant, and the calculated optimum parameter.

Since the operator thereby judges the validity of the parameter by confirming by what kind of logic a parameter is determined, and what kind of output is made as a result thereof, it is possible to determine the optimum parameter.

It should be noted that each device included in the above-mentioned parameter determination support device 11 can be respectively realized by hardware, software, or a combination of these. In addition, the parameter determination method performed by each device included in the above-mentioned parameter determination support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes varies types of tangible storage media. Examples of non-transitory computer readable media include magnetic media (for example, flexible disks, magnetic tape, hard disk drive), magneto-optical recording media (for example, magneto-optical disk), CD-RCM (Read Only Memory), CD-R, CD-R/W, and semiconductor memory (for example, mask ROM, PROM (Programmable ROM), EPROM (Erasable PROM), flash RCM, RAM (random access memory)). In addition, the program may be supplied to the computer by various types of transitory computer readable media. Examples of transitory computer readable media include electrical signals, optical signals and electromagnetic waves. The transitory computer readable media can supply programs to a computer via a wired communication path such as electrical lines and optical fibers, or a wireless communication path.

It should be noted that, in the above-mentioned embodiment, it may be configured so that the automatic measurement part 117 automatically measures operating information a plurality of times, and use the average value. By increasing the number of times that the automatic measurement part 17 automatically measures and then uses the average value, it is possible to eliminate error in local values from noise, speed fluctuation, etc., and consequently, the statistical reliability of the measurement data can be improved.

EXPLANATION OF REFERENCE NUMERALS 1 motor drive system
11 parameter determination support device
21 numerical control device
31 motor drive device
41 induction motor
111 control unit
112 detection unit
113 input unit
114 acquisition part
115 initial parameter determination part
116 program creation part.
117 automatic measurement part
118 estimation part
119 calculation part
120 display part

What is claimed is:

1. A parameter determination support device for supporting determination of a control parameter of an induction motor, the parameter determination support device comprising:

an automatic measurement means for automatically measuring characteristic information including speed during acceleration and acceleration upon driving the induction motor to accelerate from start up to a predetermined speed set in advance which is no more than a base speed of the induction motor, relative each slip constant, based on a plurality of slip constants set in advance;

an estimation means for estimating, as a slip constant of the induction motor, a slip constant having the smallest variation in the acceleration, among the plurality of slip constants, based on the characteristic information; and wherein the estimation means further makes a linear approximation of a variable relative to the speed of the acceleration in a predetermined speed range which is no more than the base speed for each slip constant, and estimates, as a slip constant of the induction motor, a slip constant having the smallest slope of a variable relative to the speed of the acceleration which was linear approximated, among the plurality of slip constants.

2. A parameter determination supporting method for supporting determination of a control parameter of an induction motor which is realized by a computer, the method comprising:

an automatic measurement step of automatically measuring, based on a plurality of slip constants set in advance, characteristic information including a speed during acceleration and acceleration upon driving the induction motor to accelerate from start up to a predetermined speed set in advance which is no more than a base speed of the induction motor, relative to each slip constant;

an estimation step of estimating, based on the characteristic information which was automatically measured in the automatic measurement step, a slip constant having the smallest variation in the acceleration among the plurality of slip constants, as the slip constant of the induction motor; and wherein the estimation step further makes a linear approximation of a variable relative to the speed of the acceleration in a predetermined speed range which is no more than the base speed for each slip constant, and estimates, as a slip constant of the induction motor, a slip constant having the smallest slope of the variable relative to the speed of the acceleration which was linearly approximated, among the plurality of slip constants.

3. A non-transitory computer-readable medium encoded with a program for causing a computer to operate as the parameter determination support device according to claim 1.

* * * * *